United States Patent [19]

Minami

[11] Patent Number: 4,793,293
[45] Date of Patent: Dec. 27, 1988

[54] COOLING AIR INTAKE STRUCTURE FOR SMALL-SIZED VEHICLES

[75] Inventor: Hidemi Minami, Saitama, Japan

[73] Assignee: Honda Giken Kogyo Kabushiki Kaisha, Tokyo, Japan

[21] Appl. No.: 21,838

[22] Filed: Mar. 4, 1987

[30] Foreign Application Priority Data

Mar. 7, 1986 [JP] Japan .................. 61-31989[U]
Apr. 25, 1986 [JP] Japan .................. 61-62886[U]

[51] Int. Cl.⁴ .......................... F02P 1/02; F02P 1/06
[52] U.S. Cl. .................. 123/41.7; 123/41.61; 280/289 S
[58] Field of Search .......... 362/72; 123/41.7, 41.6, 123/41.61, 41.62; 280/289 S; 296/78.1

[56] References Cited

U.S. PATENT DOCUMENTS

| 2,644,435 | 7/1953 | Hoxie | 123/41.61 |
| 3,650,250 | 3/1972 | Lohr et al. | 123/41.7 |
| 4,452,185 | 6/1984 | Larsen et al. | 123/41.7 |
| 4,498,700 | 2/1985 | Fujii et al. | 280/289 S |
| 4,515,405 | 5/1985 | Ogishima | 362/72 |
| 4,632,070 | 12/1986 | Onda et al. | 123/41.7 |
| 4,678,223 | 7/1987 | Kishi et al. | 280/289 S |

Primary Examiner—Raymond A. Nelli
Attorney, Agent, or Firm—Lyon & Lyon

[57] ABSTRACT

In a small-sized vehicle such as a motorcycle, a motor tricycle or the like in which a front portion of a vehicle body is covered by a vehicle body cover and a carburetor is disposed inside of the vehicle body cover, a cooling air intake port is formed on the front surface of the vehicle body cover, a cooling air duct adjoining to the cooling air intake port is extended backwards of the vehicle body for guiding running wind intaken through the cooling air intake port to the carburetor through the cooling air duct, and thereby the carburetor is cooled. A second cooling air duct serving to guide running wind intaken through the cooling air intake port to a radiator, could be provided integrally with the above-mentioned cooling air duct.

9 Claims, 7 Drawing Sheets

COOLING AIR INTAKE STRUCTURE FOR SMALL-SIZED VEHICLES

BACKGROUND OF THE INVENTION

The present invention relates to small-sized vehicles such as motorcycles or motor tricycles having a front portion of a vehicle body covered by a vehicle body cover, and more particularly to a cooling air intake structure for suppressing temperature rise of a carburetor.

Normally, in a motorcycle or the like, an engine is supported by main pipes and down tubes which are connected to a head pipe in a front portion of a vehicle body, and a carburetor is disposed in the proximity of the engine, and one would find many motorcycles in which a vehicle body cover covering the front portion of a vehicle body is mounted in order to improve stream line of running wind.

However, if the proximity of a carburetor is covered by the vehicle body cover, then as a flow of wind in the proximity of the carburetor is little upon running, the temperature of the carburetor is liable to rise due to influence of heat generated in the engine, and when the temperature of the carburetor rises, not only the amount of intake air of the engine is reduced, but also the air-to-fuel ratio varies and the output of the engine is lowered. Accordingly, it is necessary to guide running wind to the space portion where the carburetor is disposed and thereby suppress temperature rise of the carburetor. Especially, a carburetor of a V-type engine is liable to be influenced by heat generated in the engine because the carburetor is disposed in the space portion between the cylinders arranged in a V-shape.

SUMMARY OF THE INVENTION

One object of the present invention is to suppress temperature rise of carburetor in a small-sized vehicle in which the front portion of the vehicle body is covered by a vehicle body cover.

The above-mentioned object can be achieved by forming a cooling air intake port on a front surface of the vehicle body cover, and providing a cooling air duct which adjoins to the cooling air intake port and extends backwards of the vehicle body for guiding running wind coming into the cooling air duct towards the carburetor.

DETAILED DESCRIPTION OF THE PREFERRED EMBODIMENTS

Figure 1:
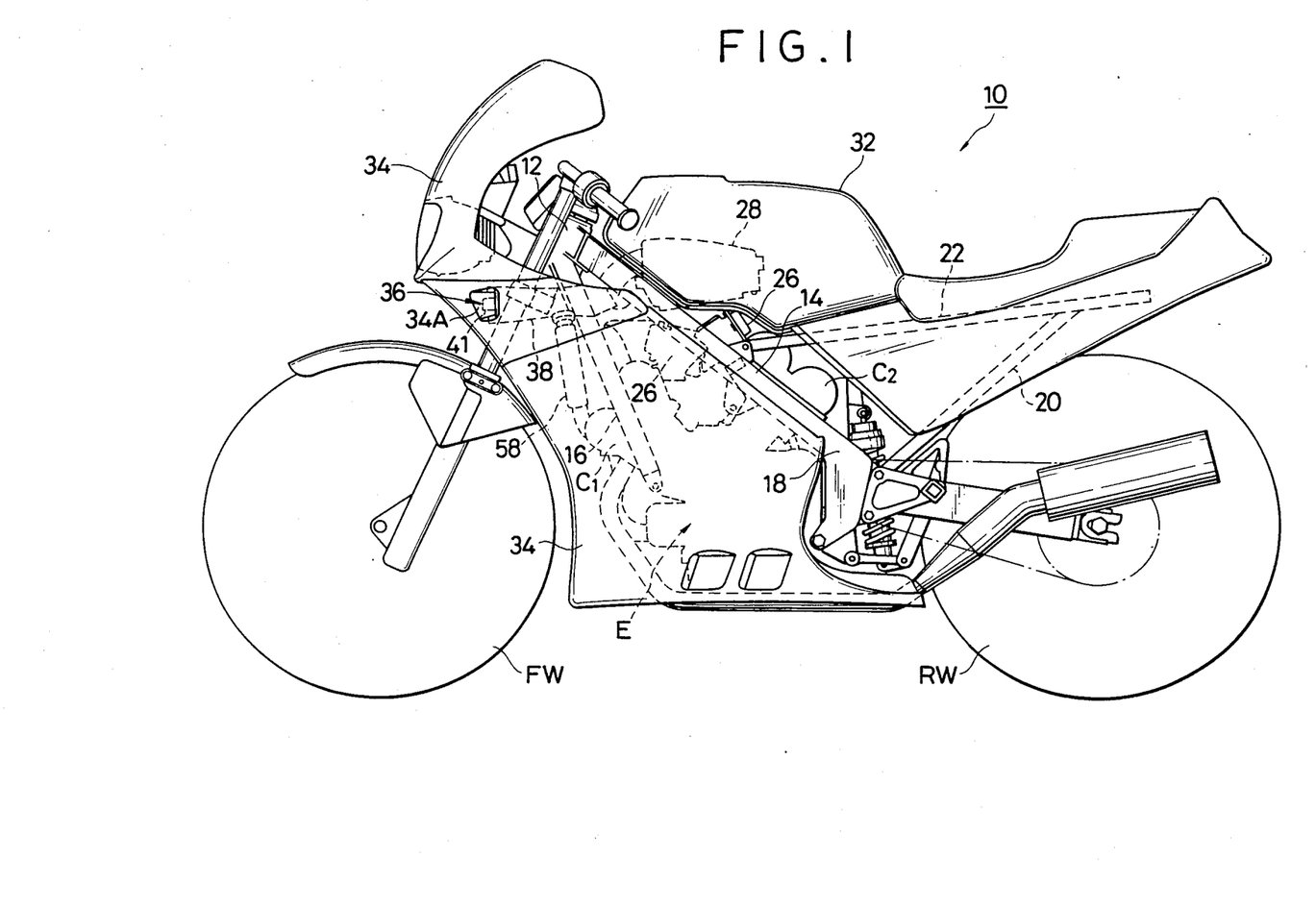
FIG. 1 is a schematic left side view of a motorcycle employing a cooling air intake structure according to one preferred embodiment of the present invention.
Figures 2A, 2B:
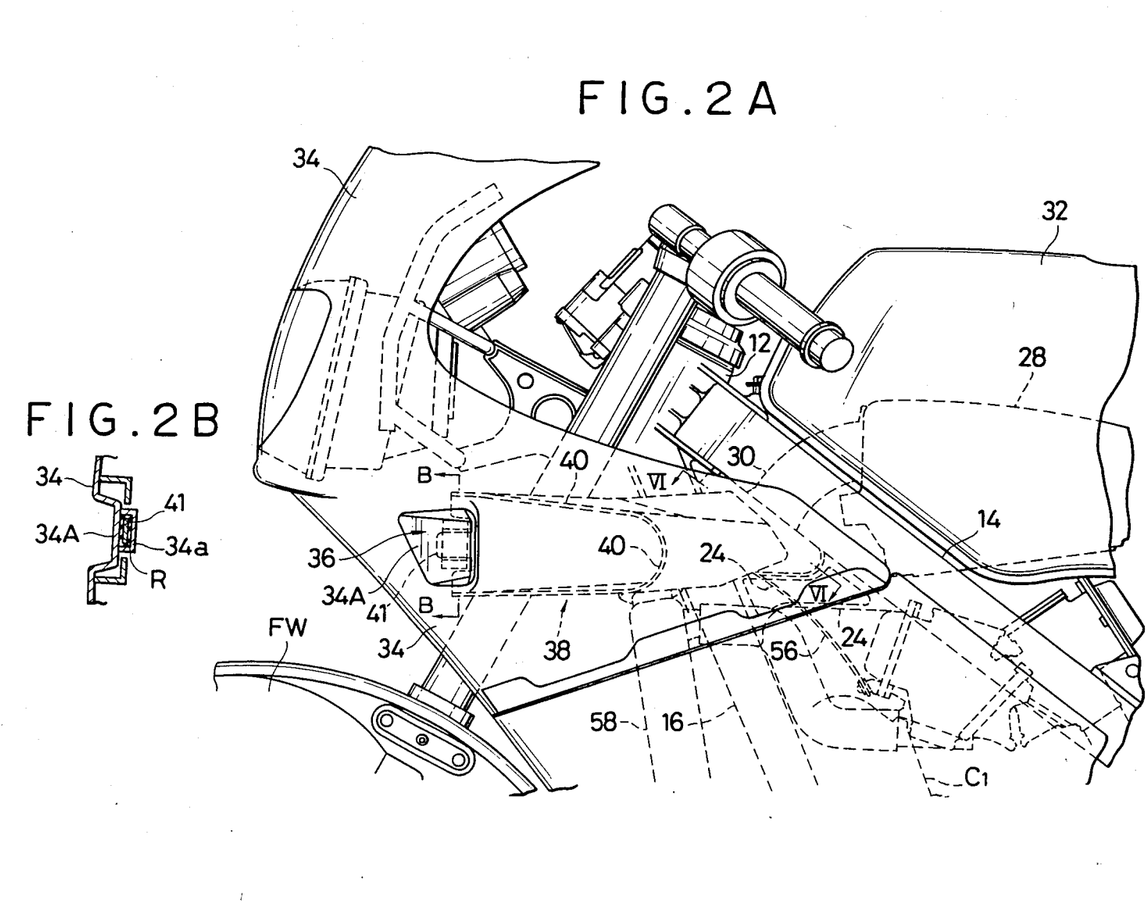
FIG. 2A is an enlarged view of an essential part of the same motorcycle.
FIG. 2B is a cross-section view taken along line B—B in FIG. 2A.

FIG. 1 shows, as a schematic left side view, a motorcycle 10 having a front-rear V-type engine E mounted between front and rear wheels FW and RW and having a front portion of its vehicle body covered by a vehicle body cover 34, and a part of the motorcycle is shown in enlarged scale in FIG. 2A. A vehicle body frame of the motorcycle 10 is formed of main vehicle body frame elements consisting of a head pipe 12 which rotatably supports a rotary shaft of a steering handle, a pair of left and right main pipes 14 having a rectangular cross-section which extend backwards of the vehicle body from where it adjoins the head pipe 12, center pillars 18 connected to the rear ends of the main pipes 14, a pair of left and right down tubes 16 extending downwards in an inclined attitude from where they adjoin the head pipe 12 and having an engine E suspended at their lower ends, a pair of left and right back stays 20, extending backwards of the vehicle body in a rising inclined attitude from where they adjoin the center pillars 18, a pair of left and right seat support pipes 22 extending backwards of the vehicle body from where they adjoin the main pipes 14 and connected at their rear ends to the back stays 20. At a position close to the head pipe 12, on the left and right sides of the vehicle body, respectively, the main pipe 14 and the down tube 16 which are disposed above and below are connected with each other by reinforcing member 24.

In addition, a carburetor 26 is disposed between front and rear cylinders $C_1$ and $C_2$ of the engine E, an air cleaner 28 is disposed above the carburetor 26, and fresh air to be used for combustion is fed to the cylinders $C_1$ and $C_2$ through the air cleaner 28 and the carburetor 26. A fuel tank 32 covering the top of the air cleaner 28 is fixedly placed on the vehicle body frames.

Figure 3:
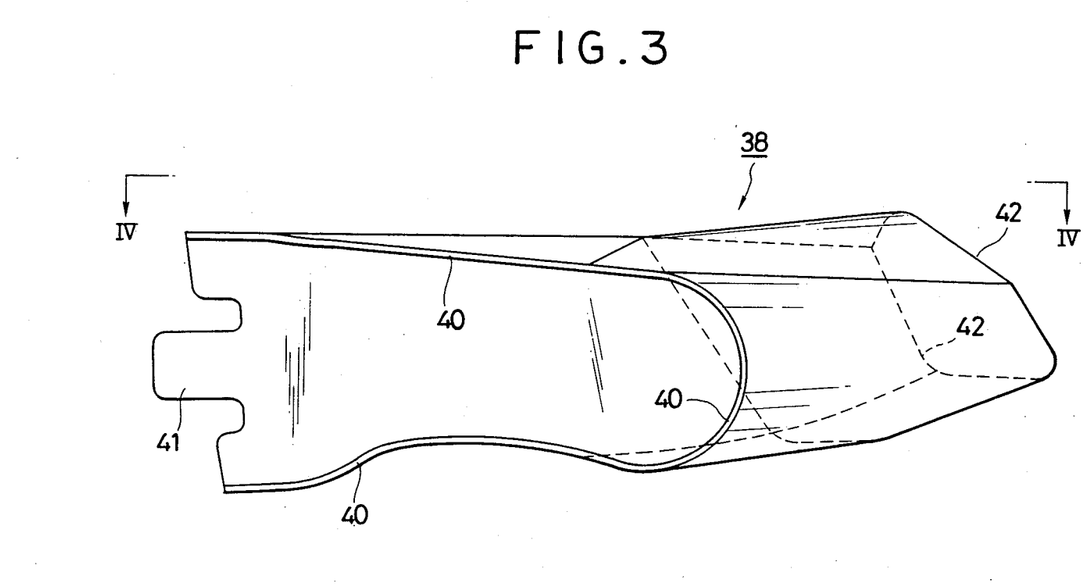
FIG. 3 is a side view of a cooling air duct forming one constituent element of the above-mentioned cooling air intake structure.
Figures 4, 5:
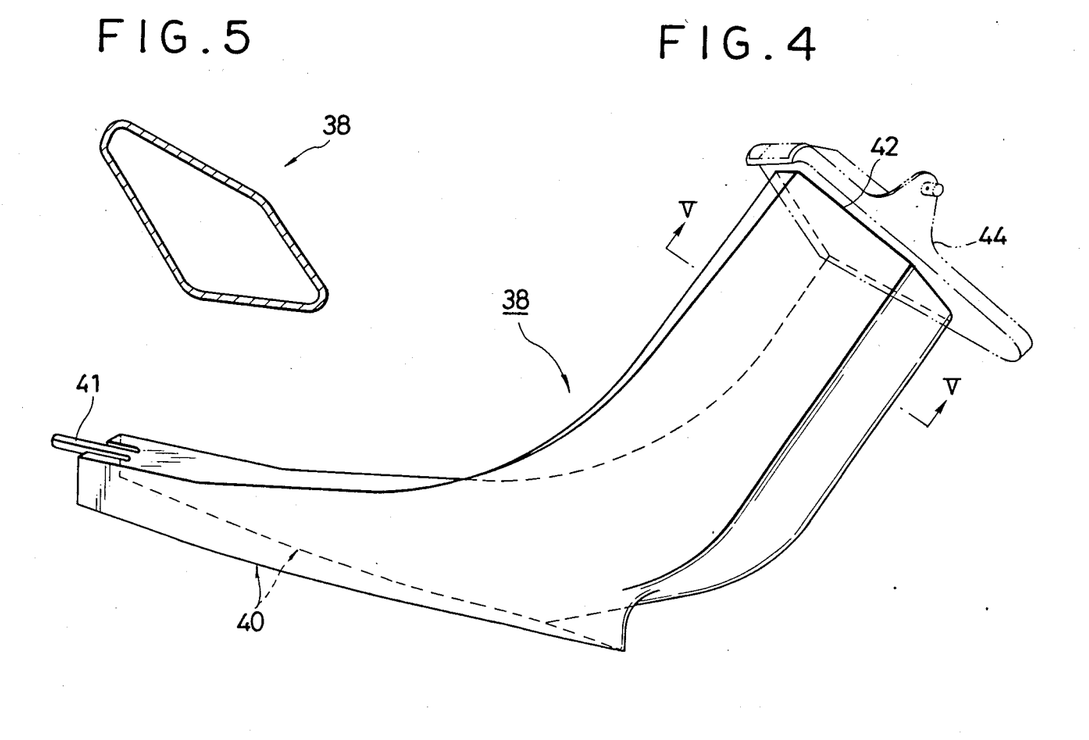
FIG. 4 is a plan view of the same cooling air duct taken along line IV—IV in FIG. 3 as viewed in the direction of arrows.
FIG. 5 is a cross-section view of the same taken along line V—V in FIG. 4 as viewed in the direction of arrows.
Figure 6:
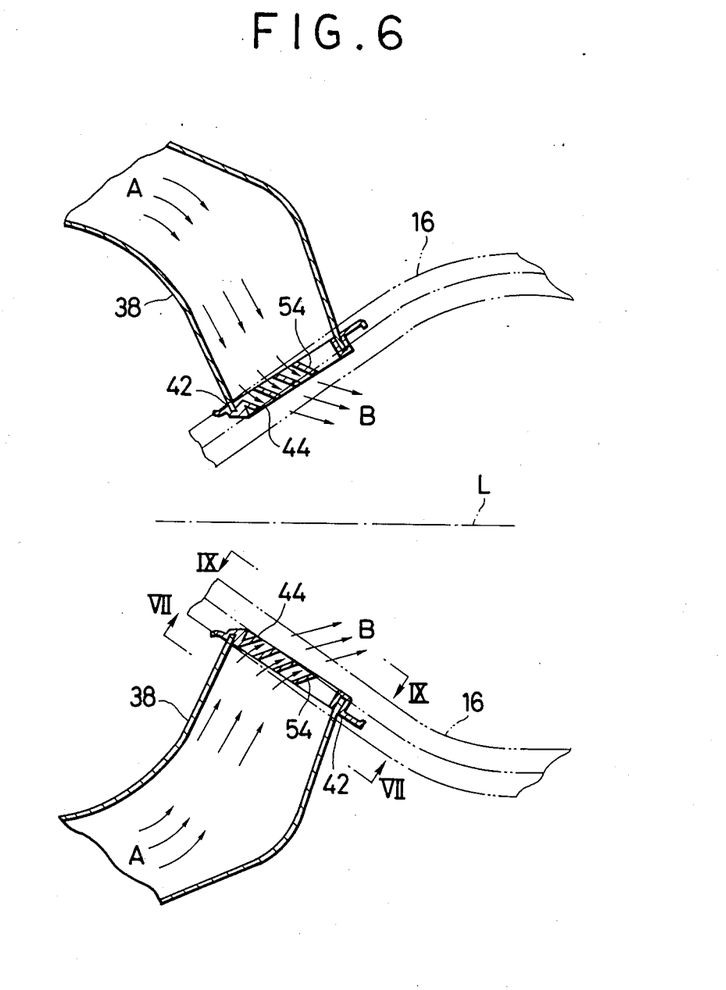
FIG. 6 is a cross-section view taken along line VI—VI in FIG. 2A as viewed in the direction of arrows.

On a front surface of the vehicle body cover 34 covering the front portion of the vehicle body and supported by the vehicle body frame, cooling air intake ports 36 are formed on the left and on the right, respectively. The intake port 36 has an inlet wall 34A at the vehicle center side thereof and a U-shaped wall 34A is provided as projecting from a wall surface of the inlet wall 34A. A front end 40 of a cooling air duct 38 which catches running wind passing through the above-mentioned cooling air intake port 36 and guides the running wind, is kept in tight contact with the inner wall surface of the vehicle body cover 34, and the cooling air duct 38 is locked to the vehicle body cover 34 in fitting and locking relation between a tongue 41 formed at the extreme tip end of the cooling air duct 38 and the U-shaped wall 34a (See FIG. 2B). In FIG. 2B, reference numeral R designates a rubber buffer. The respective cooling air ducts 38 are formed in a rectangular tube curved nearly in an L-shape as viewed from above as will be seen from FIGS. 3 to 5, and they are disposed on the left and right sides in a symmetric manner with respect to a vehicle body center plane L, as shown in FIG. 6. A rear end 42 of the cooling air duct 38 is fitted in and locked to an annular locking groove 46 (FIG. 7) in a louver 44 mounted to the vehicle body frame.

Figure 7:
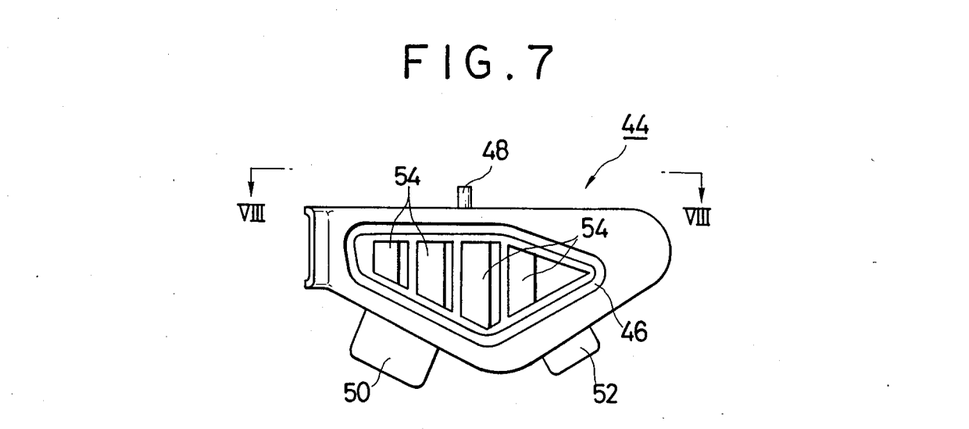
FIG. 7 is a view taken along line VII—VII in FIG. 6 as viewed in the direction of arrows.
Figure 8:
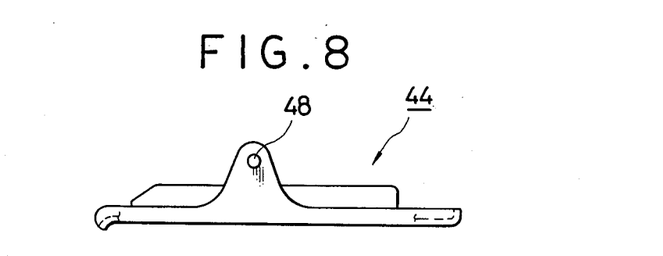
FIG. 8 is a view taken along line VIII—VIII in FIG. 7 as viewed in the direction of arrows.
Figure 9:
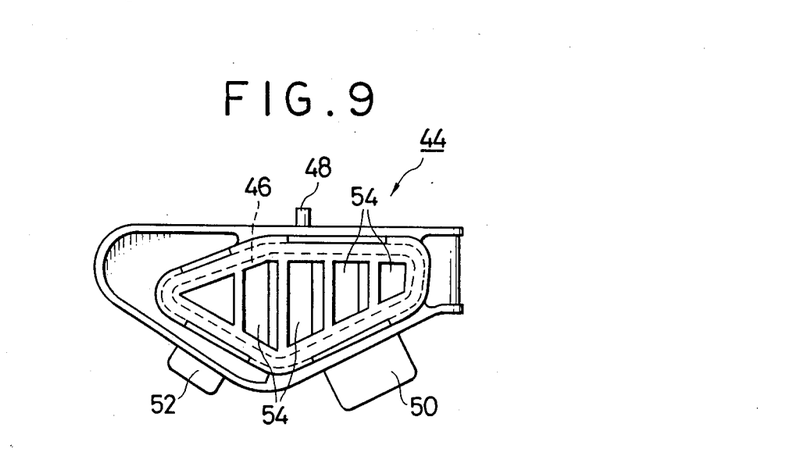
FIG. 9 is a view taken along line IX—IX in FIG. 6 as viewed in the direction of arrows.

The louver 44 is formed as a substantially triangular body, as shown in FIGS. 7 to 9, and is fitted in a triangular space portion delimited by the main pipe 14, the down tube 16 and the reinforcing member 24 (See FIG. 2A). A pin 48 provided on its upper edge as projecting therefrom is fitted in a locking port provided in the lower wall of the main pipe 14, and tongues 50 and 52 provided on its lower edge as projecting therefrom are locked to the down tube 16 and the reinforcing member 24, respectively.

Also, the louver 44 is provided with a plurality of directing walls 54, and depending upon their inclined attitudes, direction is given to the running wind flowing through the cooling air duct 38 and discharged from the louver 44, and then the running wind flows towards the carburetor 26.

In addition, a membrane wall 56 made of flexible material (for example, rubber) which is disposed between the left and right reinforcing members 24 and has its lower edge supported by the carburetor 26 and its upper edge supported from a lateral frame member (not shown) associated with the left and right down tubes 16 so as to connect them with each other, is disposed in an upwardly convex shape. It is to be noted that in FIG. 2A, reference numeral 30 designates an air intake pipe of the air cleaner 28 extending through the space between the left and right main pipes 14, and an air intake port at its front end is positioned at the level of the lower wall surfaces of the left and right main pipes 14.

The illustrated embodiment is constructed in the above-described manner, and so, upon running of the motorcycle 10, running wind A enters through the cooling air intake port 36 on the vehicle body cover 34 into the cooling air duct 38, and running wind B blowing out through the louver 44 after the flow direction has been changed by means of the directing walls 54 would flow towards the carburetor 26, to effectively suppress temperature rise of the carburetor 26 by sweeping off the heat radiated from the cylinders $C_1$ and $C_2$ of the engine E.

Since the air intake pipe 30 of the air cleaner 28 has its air intake port positioned away with respect to the flow direction of the running wind B and hence is not directly influenced by the dynamic pressure of the running wind B, a sufficient amount of cooling air can be sucked into the air cleaner 28.

As described above, according to this preferred embodiment, not only temperature rise of the carburetor 26 can be suppressed but also fresh cool air can be fed to the air cleaner 28, so that in addition to the fact that reduction of the amount of the intake air for the engine can be prevented, influence upon an air-to-fuel ratio can be sufficiently reduced, and thereby the performance possessed inherently by the engine E can be fully derived.

Furthermore, according to the present invention, since the cooling air duct 38 is formed in a curved shape, in the event that rain water, mud or the like should enter into the cooling air duct 38 jointly with running wind, they would be removed by inertial collision against the inner wall of the duct 38, and so, clean air can be fed to the carburetor 26.

Still further, the membrane wall 56 can prevent turbulence of the running wind B and thereby can improve a heat sweep-off effect in the proximity of the carburetor 26, and also it can intercept heat radiated from a radiator 58 disposed in front of the down tubes 16 and thereby can eliminate thermal influence upon the carburetor 26.

Figure 10:
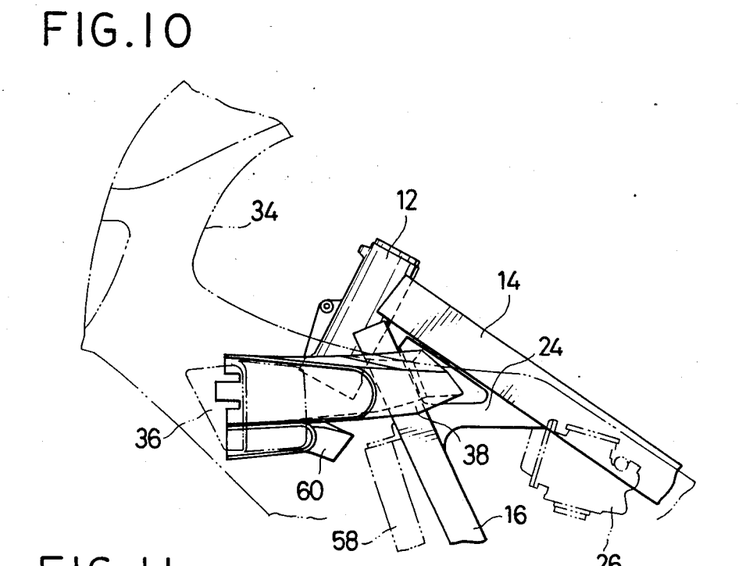
FIG. 10 is a partial schematic side view of a motorcycle according to another preferred embodiment of the present invention.
Figure 11:
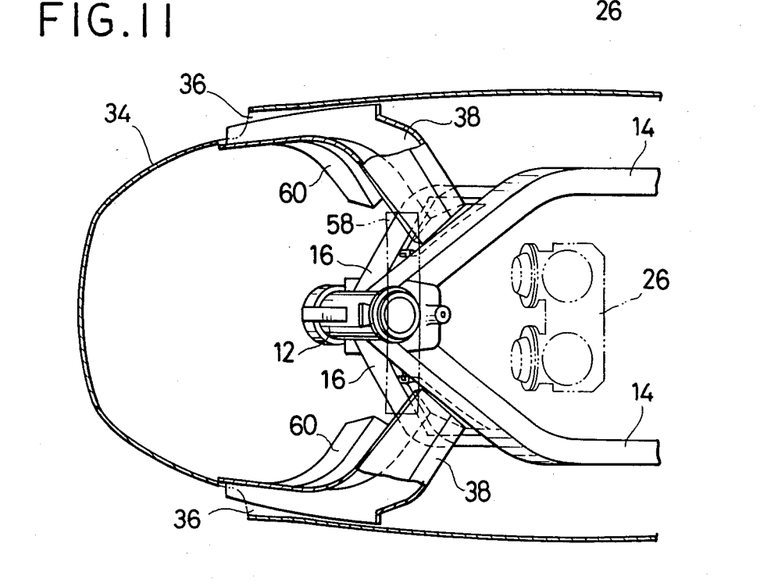
FIG. 11 is a plan view partly in cross-section of the same.

FIG. 10 and 11 illustrate another preferred embodiment of the present invention. It is to be noted that in there figures, component parts identical to those in the above-described embodiment are given like reference numerals, and detailed explanation therefor will be omitted. In this embodiment also, cooling air intake ports 36 are provided on the left and right sides, respectively, on the front surface of a vehicle body cover 34, cooling air ducts 38 respectively connected to the cooling air intake ports 36 are directed to respective triangle shaped spaces on left and right side delimited by the main pipes 14, the down tubes 16 and the reinforcing members 24, and a carburetor 26 is disposed behind the triangle-shaped spaces. However, in this modified embodiment, a second cooling air duct 60 is formed along the lower side of the cooling air duct 38 integrally therewith, and the rear end of this second cooling air duct 60 is directed towards a radiator 58 mounted in front of the down tubes 16. Accordingly, fresh cooling air intaken through the cooling air intake port 36 is guided to the cooling air duct 38 as well as the second cooling air duct 60, then it is introduced to the proximity of the carburetor 26 and the radiator 58, thereby it lowers the temperature of the carburetor 26 to prevent temperature rise of combustion air fed into the carburetor 26 and thus stabilize a thermal efficiency of the engine, and also it improves a cooling capability of the radiator 58.

What is claimed is:

1. A cooling air intake structure for a small-sized vehicle in which a front portion of a vehicle body is covered by a vehicle body cover and a carburetor is disposed behind said vehicle body cover; comprising a cooling air intake port formed on the front surface of said vehicle body cover at a side portion thereof, and a separate cooling air duct adjoining to said cooling air intake port and extending backwards of the vehicle body for guiding running wind entering into the cooling air duct towards the carburetor.

2. A cooling air intake structure as claimed in claim 1, in which the carburetor is disposed in a space portion between cylinders arranged in a V-shape in a V-type engine.

3. A cooling air intake structure as claimed in claim 1, in which a louver for directing the running wind within said cooling air duct towards said carburetor is provided at the rear end of said cooling air duct, and said louver is disposed in a nearly triangular space portion surrounded by a main pipe and a down tube connected to a head pipe in a front portion of the vehicle body and reinforcing member which connects said main pipe and said down tube with each other at their front portions.

4. A cooling air intake structure as claimed in claim 3, in which a membrane wall made of flexible material is provided between the lower side of said louver and the lower side of said carburetor.

5. A cooling air intake structure as claimed in claim 1, in which a second cooling air duct for guiding running wind to a radiator disposed in front of down tubes extending obliquely downwards from a head pipe in a front portion of the vehicle body, is formed integrally with said cooling air duct.

6. A cooling air intake structure as claimed in claim 1, in which said carburetor is disposed between left and right frame members of the vehicle body and the running wind entering into said cooling air duct is directed towards said carburetor through an opening provided in said frame member.

7. A cooling air intake structure as claimed in claim 6, in which both ends of said cooling air duct are detachably connected to said cooling air intake port and said opening respectively.

8. A cooling air intake structure as claimed in claim 1, in which an air cleaner is disposed adjacent to said carburetor and the running wind entering into said cooling air duct is further directed towards said air cleaner for cooling thereof.

9. A cooling air intake structure according to claim 1 in which said cooling air duct is longitudinally curved intermediate its ends whereby liquid entrained in the cooling air is inertially separated therefrom.

* * * * *